United States Patent
Handsaker et al.

(10) Patent No.: US 10,634,382 B2
(45) Date of Patent: Apr. 28, 2020

(54) POE CONTROLLED LIGHT FIXTURES WITH INCORPORATED POE CONTROLLED VARIABLE CONDITIONED AIR VENTS

(71) Applicant: Innovative Lighting, LLC, Roland, IA (US)

(72) Inventors: Jerrold Handsaker, Roland, IA (US); Harry Aller, Indianola, IA (US); A. Brent York, Fort Langley (CA)

(73) Assignee: INNOVATIVE LIGHTING, LLC., Roland, IA (US)

( * ) Notice: Subject to any disclaimer, the term of this patent is extended or adjusted under 35 U.S.C. 154(b) by 106 days.

(21) Appl. No.: 15/496,767

(22) Filed: Apr. 25, 2017

(65) Prior Publication Data
US 2017/0307242 A1    Oct. 26, 2017

Related U.S. Application Data

(60) Provisional application No. 62/327,158, filed on Apr. 25, 2016.

(51) Int. Cl.
| | |
|---|---|
| G05B 15/02 | (2006.01) |
| H05B 33/08 | (2020.01) |
| H05B 37/02 | (2006.01) |
| F21V 33/00 | (2006.01) |
| F24F 11/89 | (2018.01) |
| F24F 11/30 | (2018.01) |
| F24F 11/62 | (2018.01) |

(Continued)

(52) U.S. Cl.
CPC .......... F24F 11/89 (2018.01); F21V 33/0092 (2013.01); F24F 11/30 (2018.01); F24F 11/62 (2018.01); G05B 15/02 (2013.01); F21Y 2115/10 (2016.08); F24F 11/46 (2018.01); F24F 2110/10 (2018.01); F24F 2120/10 (2018.01); F24F 2120/12 (2018.01); F24F 2130/30 (2018.01); G05B 2219/2614 (2013.01); G05B 2219/2642 (2013.01); H05B 45/10 (2020.01); H05B 47/175 (2020.01)

(58) Field of Classification Search
None
See application file for complete search history.

(56) References Cited

U.S. PATENT DOCUMENTS

| | | | |
|---|---|---|---|
| 10,401,050 B2* | 9/2019 | Hirsch | F24F 13/26 |
| 2010/0014310 A1* | 1/2010 | Moyer | F21S 8/02 |
| | | | 362/554 |

(Continued)

FOREIGN PATENT DOCUMENTS

EP    3168543 A1 *    5/2017    ............... F24F 7/06

Primary Examiner — Crystal L Hammond
(74) Attorney, Agent, or Firm — Westman, Champlin & Koehler, P.A.

(57) ABSTRACT

A luminaire for lighting and for distribution of conditioned air within a space includes a housing having a lighting element, a duct opening, and at least one air vent coupled to the duct opening. The at least one air vent is configured to deliver conditioned air to the space. A method of controlling light and conditioned air delivery within a space, by a single combined lighting and conditioned air fixture, includes providing control and power signals to a controller coupled to the single combined lighting and conditioned air fixture, controlling lighting functions via the controller, and controlling conditioned air functions via the controller.

22 Claims, 5 Drawing Sheets

(51) Int. Cl.

| | |
|---|---|
| F21Y 115/10 | (2016.01) |
| F24F 130/30 | (2018.01) |
| F24F 120/12 | (2018.01) |
| F24F 120/10 | (2018.01) |
| F24F 110/10 | (2018.01) |
| F24F 11/46 | (2018.01) |
| H05B 45/10 | (2020.01) |
| H05B 47/175 | (2020.01) |

(56) References Cited

U.S. PATENT DOCUMENTS

| | | | | |
|---|---|---|---|---|
| 2010/0259931 | A1* | 10/2010 | Chemel | F21V 17/02 |
| | | | | 362/249.02 |
| 2010/0296285 | A1* | 11/2010 | Chemel | F21S 2/005 |
| | | | | 362/235 |
| 2011/0122603 | A1* | 5/2011 | Shamshoian | E04B 9/02 |
| | | | | 362/149 |
| 2012/0098425 | A1* | 4/2012 | Arik | F21V 23/006 |
| | | | | 315/35 |
| 2012/0120635 | A1* | 5/2012 | Strong | F21V 21/084 |
| | | | | 362/105 |
| 2012/0235579 | A1* | 9/2012 | Chemel | F21S 2/005 |
| | | | | 315/152 |
| 2015/0201561 | A1* | 7/2015 | Oakes | A01F 15/0705 |
| | | | | 100/7 |
| 2017/0238401 | A1* | 8/2017 | Sadwick | A61N 5/01 |
| | | | | 315/294 |
| 2017/0307242 | A1* | 10/2017 | Handsaker | F24F 11/89 |
| 2017/0315697 | A1* | 11/2017 | Jacobson | G06F 16/26 |

* cited by examiner

POE CONTROLLED LIGHT FIXTURES WITH INCORPORATED POE CONTROLLED VARIABLE CONDITIONED AIR VENTS

RELATED APPLICATIONS

The present application is based on and claims the benefit of U.S. provisional patent application Ser. No. 62/327,158, filed Apr. 25, 2016. A related disclosure entitled MODULAR LUMINAIRE AND METHOD OF MANUFACTURE and filed on even date herewith further discloses luminaire designs that significantly reduce the component count and bill of materials required for illumination devices that can also support additional functions beyond lighting, including some of those disclosed herein.

BACKGROUND

Conventional lighting fixtures for the last century have largely been manufactured in factories employing raw materials such as steel, aluminum, glass and plastic with lighting components such as light bulbs, sockets, ballasts and wire. The processes used have resulted in the term "metal benders" as a colloquial expression to describe the traditional lighting companies that employ standard industrial processes to construct lighting fixtures by wrapping metal around conventional light bulbs. The constituent parts of conventional lighting fixtures are primarily made from sheet metal, extrusions and other raw materials such as plastics that are heavily processed in factories with die cutting, punching, forming, welding, painting and other industrial processes. During the last decade, with the rapid decline in price and rapid increase in performance, the Light Emitting Diode or 'LED' has reached the point where its performance exceeds all conventional light sources and its cost now rivals conventional light sources, especially where the total cost of ownership over the life of the lighting installation is considered. The properties of LEDs, combined with the miniaturization of the scale for electronics of all types has created a unique circumstance for the invention of new devices in the ceiling area of buildings that can provide for illumination and other useful functions. Furthermore, the miniaturized scale of LEDS also creates opportunities for miniaturization of lighting functions which can be combined with other systems to drive improved economics and reduced environmental impact.

Similarly, conventional HVAC systems comprise heaters, chillers, fans, ducts, dampers and vents that provide for the controlled flow of "conditioned" air within the space. The installation of these systems is usually done at the building inception, or major renovation, and these systems often remain in place through retrofit cycles of surfaces, furniture, wall treatments and floor coverings. These HVAC systems are conventionally separated from the lighting functions and are usually installed and managed by a different group of contractors and specialists that fine tune the building's HVAC automation systems to control the comfort level of spaces. Rarely do these HVAC and lighting systems cooperate, except in the relatively well known case of, so called "air handling" luminaires, which are primarily about the provision of an "exhaust path" through the luminaire into the ceiling plenum (the area above the ceiling tiles) where air can eventually be recycled, or vented, from the space through a hidden HVAC inlet duct. These passive systems fail to provide much more functionality than a convenient exhaust ventilation path within the space and are far from automated.

There is therefore a real need to consider how the miniaturization of lighting functions can be combined with suitable hardware structures into so called "service nodes" that can exist in the ceiling plane that can provide multiple functions such as lighting and HVAC that can optionally be combined with sensing and response feedback to integrated control systems.

There is therefore also a need for improvements in HVAC zone control, and for HVAC functions that can be used without requiring high voltage, that can provide multiple functions such as lighting and HVAC that can optionally be combined with sensing and response feedback to integrated control systems.

SUMMARY

The present disclosure is directed to advanced luminaire designs and structures that integrate components of lighting and Heating Ventilation and Air Conditioning "HVAC" into service nodes that bridge all of these functions with a safe, low voltage, integrated device. Embodiments of the disclosure are environmentally advantageous since they are highly efficient and have excellent cradle to cradle properties for recycling and re-use while reducing the entire environmental footprint for integrated combinations of lighting, HVAC, sensing, power and control systems in buildings.

The present disclosure is in the technical field of integrated lighting fixtures combined with active or passive air flow devices, and controls into overhead "service nodes" as will be described in more detail within the specification herein.

The present disclosure is directed to various service node structures that will typically reside within the ceiling area of a space that greatly simplify the environmental footprint for the provision of lighting, HVAC and other functions.

In one embodiment, a luminaire for lighting and for distribution of conditioned air within a space includes a housing having a lighting element, a duct opening, and at least one air vent coupled to the duct opening, the at least one air vent configured to deliver conditioned air to the space.

In another embodiment, a method of controlling light and conditioned air delivery within a space, by a single combined lighting and conditioned air fixture includes providing control and power signals to a controller coupled to the single combined lighting and conditioned air fixture, controlling lighting functions via the controller, and controlling conditioned air functions via the controller.

In another embodiment, a combined system for control of conditioned air and lighting within a space includes a distribution box coupleable to an air source and to a low voltage power supply, the distribution box including at least one duct opening controlled by a valve, at least one service node coupled to the distribution box by the at least one duct, the at least one service node comprising a lighting system and an air flow system, and a controller for control of functions of the distribution box and the at least one service node. The service node is coupled to the source of conditioned air through the at least one duct, and is coupled to the controller and configured to operate lighting and conditioned air functions with power and data signals received from the controller.

In another embodiment, a combined system for control of conditioned air and lighting within a space includes a controller, a distribution box coupled to the controller, the distribution box coupleable to a source of conditioned air, the distribution box comprising at least one duct, and a service node comprising a light system and an air flow system. The service node is coupled to the source of conditioned air through the at least one duct, and coupled to the controller to receive power and data.

In another embodiment, a system for control of conditioned air within a space includes a distribution hub coupled to a source of conditioned air, a luminaire having a light and at least one vent to provide conditioned air, fresh air, or a combination thereof to the space, the at least one vent coupled to the distribution hub, and a controller coupled to the luminaire to control operation of the light and to control provision of the conditioned air and the fresh air.

Aspects of the disclosure include those discussed below under the heading aspects of the disclosure/claims, although the disclosure is not so limited, and additional functions and uses, improvements, refinements, and the like are within the scope of those skilled in the art, and are therefore contemplated by the disclosure.

DETAILED DESCRIPTION

Figure 1:
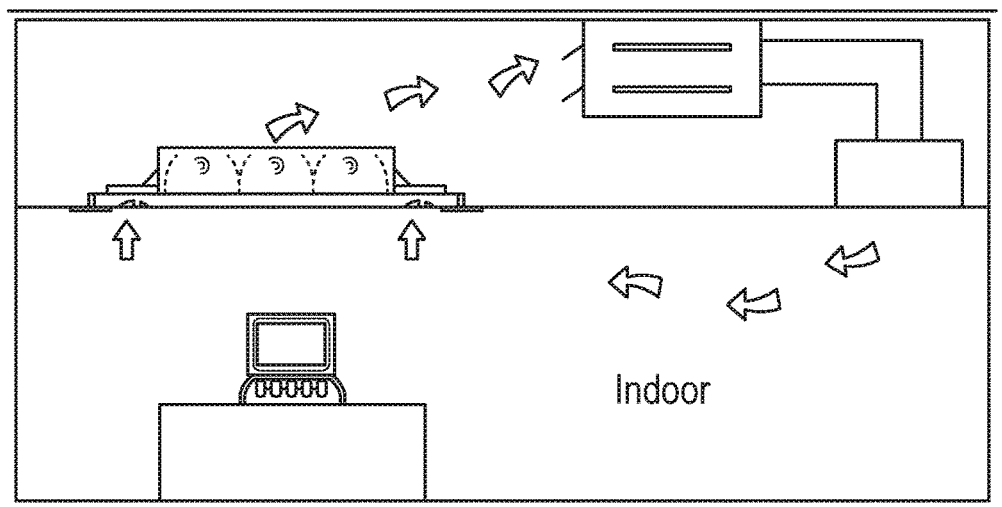
FIG. 1 is a prior art "air handling" fixture diagram.

The traditional commercial office ceiling contains many systems including several lighting fixtures, a series of heating/cooling/return air vents, often with high voltage (110-120 Volts AC) zone control systems, plumbing, sprinkler supply, electrical supply including for zone control systems, and cabling for data networks. However, in the exposed ceiling surface it is primarily the light fixtures and air ventilation penetrations that are visible to the space below. The balance of the ceiling is vacant. The lighting fixtures are usually confined to particular locations as they are needed to be distributed to balance lighting levels and are powered by high voltage AC power which is protected by steel conduit which is terminated by attaching it to the electronic light fixture. The lighting fixtures are usually installed and maintained by a licensed electrician and are considered as part of the overall electrical system operating within the building and office. Typical data networks for the provision of data to desktop computers and phones are also installed within the ceiling plenum and are often delivered by multi-conductor low voltage cable systems such as a category cable (e.g., CAT 5, CAT 5e, CAT 6, CAT 7 cable), or equivalent multi-conductor cable-. These cable runs often come from a "server room" and are strung through the ceiling plenum with "drops" within walls and intermediate locations throughout the office to receptacles where PCs and phones can be plugged in. These are usually low voltage or power limited systems which are usually installed and maintained by network IT installation specialists. One of the primary advantages for these low voltage networks is that the provisions for electrical safety that apply to conventional AC service voltages (e.g., 120 Volts, 240 Volts, etc.) do not apply, which allows the wiring to be run through spaces above and around the office without the difficulty of installing it within rigid or metallic conduit, or for terminating within electrical junction boxes. Such cables may be used to provide power to low voltage devices through what is referred to as power over Ethernet (POE).

The HVAC air vents in the ceiling are usually supplied with air through flexible or fixed ducting running from the heating or cooling equipment (hereinafter "HVAC equipment") to, most commonly, louvered openings that can be manually adjusted to deflect air flow away from directly hitting occupants in the space. The heated or cooled air from the equipment (hereinafter referred to as "conditioned air") flows from the HVAC equipment to the office by passing thru the ducting to the vents which allows the conditioned air to enter the room. Usually the vents are installed by the HVAC personnel and are very seldom repositioned in the building during its lifetime. The heating and cooling of the building is typically designed, operated, and maintained by HVAC personnel and building engineers, separate from the electrical system and data networking systems.

Notably, these systems are all independent and forced coordination of the HVAC and lighting systems, for example, is historically not combined as they are usually installed and maintained separately with their individual control systems.

This disclosure provides a way to integrate HVAC and lighting functions with a shared power and control system within the occupied space thru one networked system which automates the process and provides better individual comfort to the users while reducing the overall energy required. Prior art lighting fixtures that include "air handling" such as in FIG. 1 simply provide a simple return air path into the ceiling plenum (the space above the acoustic ceiling tiles in a suspended ceiling) where it can be collected and either vented or recycled within the HVAC system. The fixture modifications in these systems are not controlled and fail to unite the functions of the HVAC system with the lighting system. Prior art zone controls require high voltage wiring, and must be installed by licensed electricians.

Figure 2:
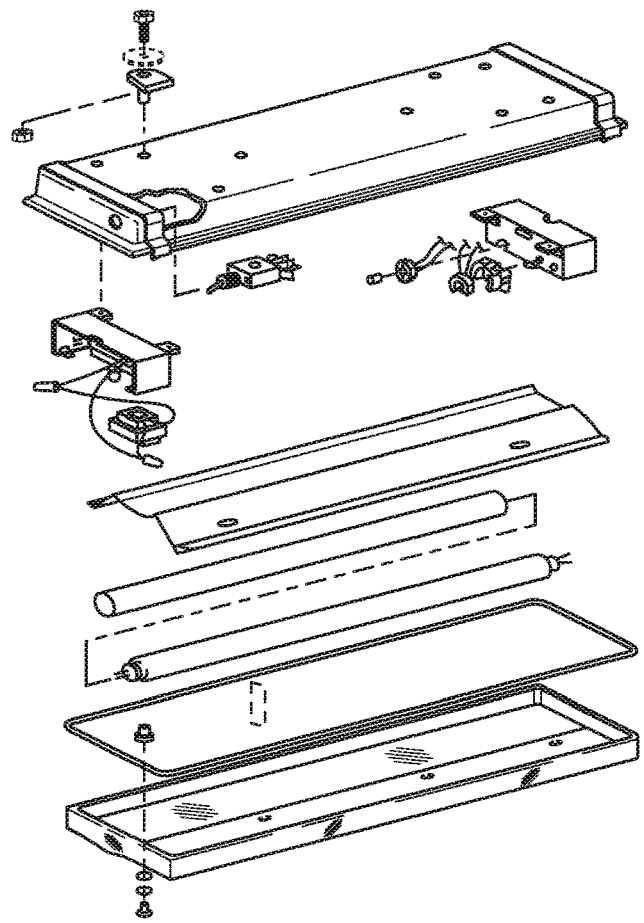
FIG. 2 is an exploded view of a conventional recessed "troffer" fixture.

FIG. 2 is an exploded view of a common prior art troffer fixture that employs conventional fluorescent tubes. The common approach taken by many established manufacturers that are switching to LEDs as light sources is to replace the fluorescent tubes with LED tubes or, in other cases, with elongated LED arrays and diffusers that provide a facsimile of the existing form and function that was commonly provided by the fluorescent tube embodiment. However, this approach continues to re-use the conventional metal housing and formed plastic lenses of its predecessor while providing virtually no additional cost savings or functionality in terms of light output and other attributes.

This disclosure includes embodiments which provide for active control of conditioned air within an office space by virtue of valves, vanes, dampers or other mechanisms which can control one or more of the direction or the mass flow rate for conditioned air within the office space at different locations within the air duct system. Embodiments of the disclosure include active zone control and distribution built in, for example, the luminaire housing, attached to the luminaire housing, included in an intermediate position along a duct that is feeding the luminaire housing, to the ducts or plenums of a residential or commercial building, or at a distribution box where individually controlled ducts feed a plurality of light fixtures with differential air flows based upon a desired state for conditioned air below the ceiling plane. In some embodiments, distribution of conditioned air may be made through lighting fixtures, as discussed further in the related co-owned application described above In one embodiment, a light fixture includes incorporated active ventilation louvers or ducts that can be individually powered and controlled within a network. The device is powered and controlled by the same category cable which powers and controls the light and required conditioned air distribution. Lighting fixtures are usually distributed throughout an office work space in the most efficient manner possible to provide lighting to the office occupants.

By having the conditioned air adjustably applied from each light fixture in varying amounts within that office allows providing most of the conditioned air closest to the occupant's desk or work space and less to the un-occupied areas of the office. If the occupant rearranges the office and moves the desk to a different location, the lights in that location can be programmed to increase the conditioned air flow in the new desk location and restrict the conditioned airflow through the other fixtures where the desk was previously located. These systems may further be programmed to anticipate the location and timing for the occupant so that the preferred conditions can be established in advance of the user's arrival. For example, lighting can be switched on and adjusted just prior to the user arriving at their office so it is optimally illuminated for their particular needs when they arrive. One embodiment includes the notion that light levels may need to be adapted to be brighter upon first arriving as the user is often adapted to much higher light levels outside and will feel that the room is overly dim until they adjust to the normal settings which can be gradually reduced as the user starts their day. Specifically, their office environment will be set a little brighter upon their arrival and gradually dim down over a period of time. Still further, when the occupant leaves the space, air flow can be reduced, and when the occupant returns to the space, air flow can be increased, and the normal operating temperature in that part of the space will recover quickly.

Occupancy may also be schedules, so that upon return to a space that has been unoccupied, the system brings the space temperature to the normal operating temperature at the start of the occupancy.

A second consideration is that desired air temperature for users may take time to accomplish as mass airflow needs to start more in advance of the user's arrival to address the thermal inertia within the space. Here, in one embodiment, the system may obtain information from, for example, the user's smartphone or other means that will provide a context based alert that the user is on his way to arrive at the office within some longer timeframe. With this information, the HVAC system can start in advance so that the preferred temperature is reached before the user arrives. A mediation of the system could occur for occupants as the system is context aware that they've come from the gym or from home. The system could obtain information on the user's body temperature and compare this against outside temperatures or other ambient temperatures such as the user's car and use this information to gradually learn the optimal temperature set point that will coincide with the user's maximum comfort level upon arrival. Throughout the day this temperature may be mitigated by the system by tracking the user's body temperature. A further feature of this programmed temperature mediation system within the ceiling node is that it can also be controlled to provide additional cooling for example when the user is close to the windows and internal cameras or light level sensors determine that the user is exposed to additional radiated thermal or optical radiation from either windows or equipment within the space.

The same fixtures can be programmed to restrict the flow of most conditioned air into the office if the light switch is turned off or an occupancy sensor indicates the office space is vacant. This restriction may be tied to a temperature sensor which can limit the allowable increase or decrease of temperature in the unoccupied office.

Since the lights are powered by flexible category 5 cable and the ventilation ducts are flexible, repositioning the new device within the office as usage of the space changes is straightforward and routine. This will ensure that the device will be located in the most efficient position to deliver the right amount of work and conditioned air to the occupant.

The foregoing embodiment envisions an active vent or valve system within the light fixture.

In an alternative embodiment, active valves are included within an air distribution hub located above the ceiling which would then control the air entering smaller flexible air tubes that distribute the air from the hub thru the ventilation slots contained in the light fixtures located in the office ceiling. The air handling hub would again contain valves which would be controlled by signals carried on category cables indicating which areas of the office space needed additional or less conditioned air in the area surrounding the light fixture.

Embodiments allowing pinpoint heated and cooled air distribution provide the building occupants with the most precise and efficient utilization of the conditioned air produced by the building's HVAC system. One advantage of the embodiment of the disclosure provides better comfort to the occupant while reducing overall energy consumption associated with the building HVAC system. The system may also cooperatively utilize the same occupancy sensor as the lighting system to not only turn off the lights when the space is unoccupied but also restrict the flow of conditioned air to the vacant area.

Yet another embodiment of the disclosure includes active air valves to be placed "in line" with a duct system that feeds individual luminaires or groups of luminaires. These valves can be independently powered and controlled via the networked control system thus providing for zonal control of conditioned air in the space below.

Small and multiple temperature sensors can be deployed in another embodiment within each office space commonly located within the lighting device itself. Each sensor will tie to separate lights or grouping of lights which permits multiple temperature zones in a small space such as that of a medium sized office.

The cooperative networking of the louvering system on the light fixture with the HVAC system allows embodiments of the system to lower the speed of the HVAC air distribution fan based on the sensed position of the variable air flow louvers.

Each light may contain a receptor to insert an infrared temperature sensor to read the air temperature condition of the work space in immediate proximity of the occupant rather than a sensor reading the ambient temperature near the ceiling.

Louvers in the fixtures may be operated utilizing a stepper motor, piezo activated lever, or any other equivalent electromechanical actuation mechanism to regulate the conditioned air flow to the occupant's immediate location. An electronic or magnetic sensor could give the system the location of the occupant even if he/she moved to a different location within the space, and given the known location of the occupant, automatically substitute an increased flow of conditioned air to the new location of the occupant. Similarly, if the fixture has fixed louvers that utilize an electronically adjustable baffle in the flexible ducting or distribution hub, the airflow can again be restricted in the distribution of the conditioned air and the extent of the restriction instantly reported to the system.

The active conditioned airflow regulation allows the control of the conditioned air flow to be automated by instructing the network control system to accept and respond to signals from occupancy sensors, individual location sensors and/or temperature sensors.

Louvers or other air flow gating devices could also be operated under manual control in some cases where users can mechanically tune the direction of the air flow while simultaneously controlling other characteristics via some form of thermostat feedback.

When the airflow is restricted by the system the system will then send a signal to the HVAC system to reduce the fan speed according to the new position of the vent restrictions thereby saving energy and strain on the furnace fan.

For occupants located near windows with direct sunlight, radiant energy can strike occupants and become uncomfortable to an occupant due to direct radiation transfer. Optical sensors can also be deployed to sense an amount of thermal radiation (infrared) that is striking the occupant and can signal the HVAC systems to increase the amount of local conditioned air flow and an temperature to mitigate this extra heating.

By incorporating the vents into the light fixtures the installer of the HVAC system will have fewer holes to cut into the ceiling. This reduces costs and eliminates materials that were previously required to install singularly purposed devices.

FIG. 1 is a prior art system. The HVAC system is operated on a completely separate control system than the lighting system while the lighting fixture provides a penetration through the ceiling level that will allow return air from the room to be carried up into the ceiling plenum where it can be either vented, or put through a heat exchanger or recycled in some form of recirculating system. The incoming air into the space is conditioned and driven into the space through separate grills or ducts that are placed in other locations within the ceiling. The key drawback with this prior art system is that the ceiling needs to have separate penetrations for the light fixture and the HVAC incoming air duct. Further drawbacks are that both systems need separate control systems and in many cases operate on different input voltages requiring significant complexity from the electrical services and control systems.

FIG. 2 is an exploded view of a prior art light fixture that supports the production of light in the ceiling. It contains wiring, ballasts, sockets and sheet metal reflectors and baffles to control the light, and multiple such fixtures are usually spaced throughout the ceiling in a variety of locations. It is also well known in the art to incorporate Light Emitting Diodes or (LEDs) or other electronic light sources along with drivers in similar looking fixtures that emulate the performance of the older incumbent tubular fluorescent lamp style. Unfortunately, these retrofit and new build fixtures continue to incorporate the same failings of the incumbent fixtures in terms of requiring separate locations and systems in the ceiling for incoming conditioned air, sensing and light creation.

Figure 3:
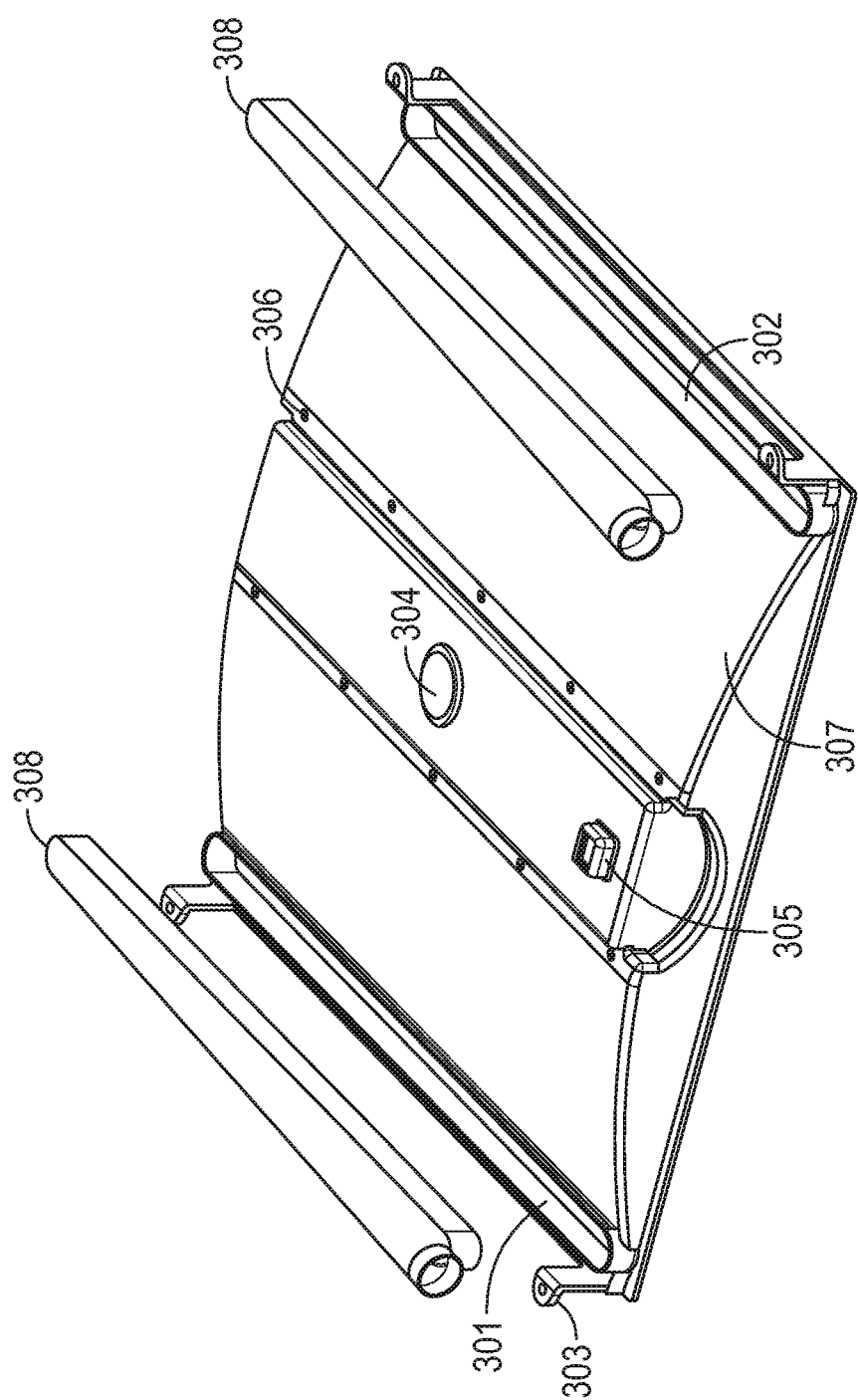
FIG. 3 is an example of a fixture housing that contains a duct for active airflow.

FIG. 3 illustrates one embodiment of a service node point apparatus 300 of the disclosure that shows the housing for a combined luminaire and HVAC service apparatus that incorporates conditioned air vents to distribute air from the HVAC system into the room from the same service node points in the ceiling as the light fixtures. This consolidation of functions includes the provision for both an inlet vent and an exhaust vent. This improvement consolidates the functions of air flow and lighting into a single ceiling service node. Since both functions are co-located within the same ceiling location, the amount of labor to install these previously unrelated systems is reduced. This service node point apparatus 300 is shown with a pair of air flow duct locations 301 and 302 which can be either dual input ducts for conditioned air or each could perform separate functions such as conditioned air into the room via one and exhaust air leaving the room via the other. A single duct slot could also be located on only one side with separate engineered flow shapes that permit conditioned air and exhaust air to be located adjacent to one another. Within the duct locations 301 or 302, automatic or manual control louvers or shapes may be employed that can both change the direction and mass flow rate of conditioned or exhaust air independently. A remote control system may be used for monitoring and anticipating the conditions needed for user comfort. Such a control could be automatically scheduled by a computer or control network to control the relative air flow from the node(s). Furthermore, the use of controlled louvers or vent systems to regulate the mass flow rate for air both into and out of the space can also be used in the event of fire or smoke or other noxious material in the room, which can effectively be controlled by the security and fire control systems to limit the spread of airborne material from adjacent areas within the space.

Housing 307 is in one embodiment formed from a single injection molded component in a single shot such that all components can be connected together to create the combined service node apparatus with a minimum of assembly steps to reduce the manufacturing complexity. Input location 305 is provided for the connection of an external combined power and data cable such as a category cable as would be commonly found in an Ethernet style network. This cable and modular cable is not shown in FIG. 3 but connects down through the input/output location 305 and connects to a circuit board within the service node which contains the electronics, light sources, processors and other components that could be used for dimming, data processing or connections to other devices that could be incorporated into the service node at various locations on, or within, its enclosure framework.

As known in the industry, category cable (e.g., CAT 5, CAT 5e, CAT 6, CAT 7 cable), or equivalent multi-conductor cable, is capable of carrying both input and output data along with power sufficient to drive a variety of devices, including, but not limited to, LEDs, UV sterilization devices, servo motors, communications devices, mechanical piezo devices, optical sensors, cameras, speakers or potentially other electro-mechanical devices as would be needed to support additional functionality. Another advantage of working with category cable and connection systems is that the power and data standards are well controlled and usually power and voltage are limited which increases the degree of safety in the installation. In many locations the requirements for a licensed electrician are also relaxed for the installation of what are historically data cables which are often routed by IT professionals without the need for bulky connection boxes, grounded lines and circuit breakers. Another advantage of this wiring method is that the connectors are designed for high reliability data connections and are often gold plated to reduce the chances of corrosion impacting the flow of data and power to peripheral devices. This property also makes these connectors and wiring schemes attractive for deployment within commercial spaces.

While only one input is shown for 305 it should be understood that a plurality of these input/output locations could be located on the luminaire. For example, location 304 could be one of many locations within the molded housing that are conveniently molded for rapid removal via punch out or other method so that an accessory device could be installed such as an emergency battery pack or a camera. Location 304 could also be used for a transducer element that could mechanically vibrate the outer housing 307 such that it behaves like a speaker. The locations noted by 306 are mounting holes for various secondary components such as optics, cable management locations, ducts, sensors or other devices to be mechanically joined to housing 307 that will complete the required functionality for a consolidated service node in the ceiling.

It should be understood that placement of openings or punchouts such as those shown at 304, 305 and 306 could be placed at other locations without departing from the scope of the disclosure. Yet, another advantage of this system over prior art systems is that it relies upon a high security network backbone that is hardwired within the space which makes it inherently less susceptible to Wi-Fi or radio-based type hacking attempts as it can be effectively firewalled apart from other systems and protected more securely than many of the systems that are being commercialized today that rely upon some form of radio connection between components. This additional level of security afforded by this system of power connection and data communications makes it also highly compatible and desirable to tie into the overall life safety envelope of the building by controlling air flow in the event of a toxic leak, fire or smoke and even providing emergency wayfinding during times of catastrophe, such as by turning on and off lights or built in beacons that could point to safe points of egress. Another embodiment of the control physical layer within the ceiling service node is that external power and data outside the service node could be supplied via category cable or equivalent cable while internal data connections within the housing employ very low energy radio connections that do not expose themselves to external interception outside the housing by virtue of either the energy used or via shielding employed within the housing or combinations thereof.

Further, additional air diverters or conduits such as 308 may be fitted to openings 301 and/or 302 to allow the performance of additional functions, including but not limited to those described herein with respect to different conditioning, filtering, sterilization, and the like.

Figure 4:
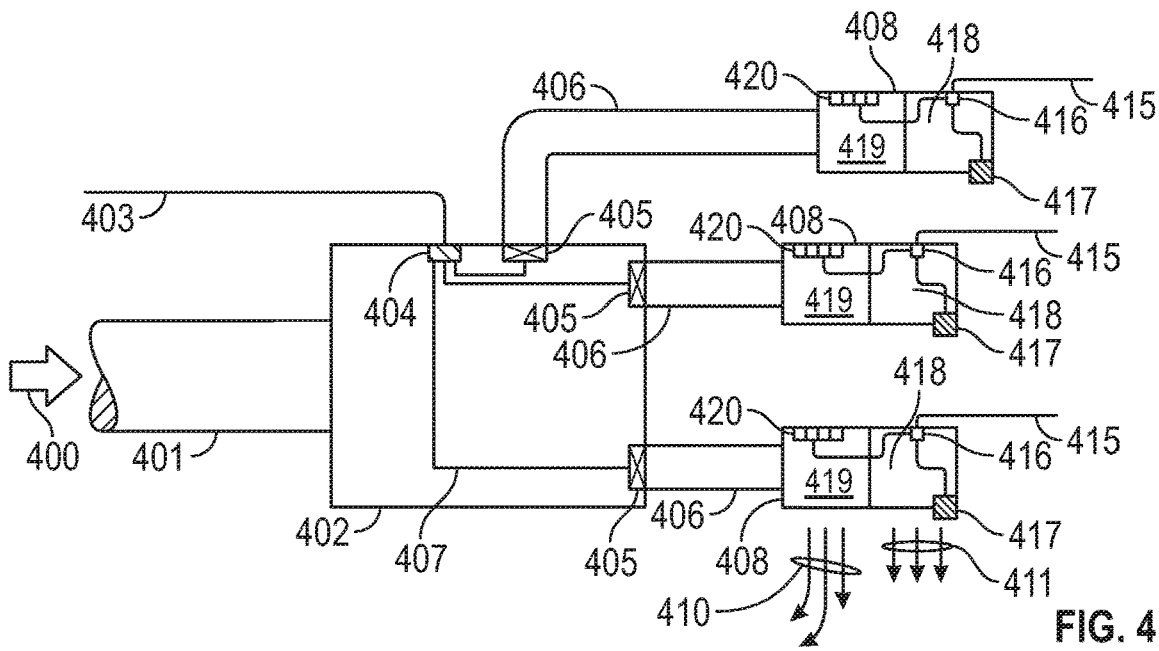
FIG. 4 is a schematic of combined HVAC and lighting system service node with an intelligent HVAC distribution hub.

FIG. 4 is a schematic view of a combined lighting and HVAC system that leverages a distribution hub for conditioned air in the ceiling. Conditioned air, for example, 400, comes from a heater or chiller source and is ducted through pipe or duct 401 to the ceiling plenum for the room where it reaches a distribution box 402. While 400 is described as conditioned air for this embodiment it is also anticipated that those skilled in the art of HVAC systems will understand that 400 could be conditioned air, return air or combinations of both conditioned and return air that could be flowing within either dual channel or secondary ducts 401 that could have their own dedicated valves 405 respectively. These valves 405 could also be operated independently to provide a controlled mass flow rate for air in the space in both the input and output side of the HVAC system. The valves 405 are in one embodiment electrically powered and controlled while this figure illustrates a distribution box with three valves 405 that are adjacent to the three ducts 406, it should be understood that installation requirements for various offices or spaces could demand as low as one duct 406 leading from the HVAC system to the ceiling node, or alternatively several ducts if the system is sized for a larger space, and that such arrangements are within the scope of the disclosure.

Also within FIG. 4, valves 405 are located within, or in the immediate vicinity, of the distribution box 402. These air valves 405 may be controlled by electrical signals that could either directly power the activation of a valve 405, or the electrical signals could provide both power and data with the instructions to trigger the power to flow to a mechanism that controls a valve 405. These electrical signals are carried by a typical low voltage line 407 that could for example also be a category cable or other electrical connection means. These lines 407 come from control or distribution block 404 which in one embodiment receives external control signals via line 403. In this embodiment both lines 403 and 407 are category type cable which can carry both data and power to devices. When an activation signal is provided on line 403 to control node 404 it interprets the signal and then activates electrical signals via some combination of cables 407 for each of the control valves 405.

Ducts 406 are also understood to carry either conditioned air or return air or combinations of both conditioned and return air that may be running parallel within the same duct. FIG. 4 only shows conditioned air for simplicity of illustration. Some fraction 410 of airflow 400 is controlled by valves 405 and directed along ducts 406 to the ceiling nodes 408 which are located in the ceiling plane of the interior space. As this air flows into ceiling nodes 408 it is introduced into section 419 of its respective ceiling node which is primarily directed to the functionality of the air management within the space. Section 419 could include a provision for multi-function element 420 which is powered by a connection to node control point 416 and provides for optional functions such as scent release, purification, negative ions or any other operation which may improve the quality of the air 410 coming from the ceiling node. For example, multi-function element 420 could be a bank of ultraviolet LEDs which irradiate the incoming air within the node with ultraviolet light such that mold, bacteria and other pathogens or odor causing elements can be eliminated so as to improve the quality of the air 410 which would be passed into the room. Alternatively, element 420 could also be a powered scent device that is powered by a connection to node control point 416 to release a scent from a local reservoir (not shown) into the airflow 410 to condition the air for a pleasing olfactory response.

Not illustrated in FIG. 4 but anticipated in the region of transition for air 410 coming from section 419 is the provision for optional air control surfaces, powered louvers or other mechanisms that could either control the mass flow rate or other air diffusion properties such as direction of the air flow by either manual or automatic means. These components permit fine tuning of the spatial control of air within the space and could for example, deflect air away from a window space and instead direct it downwards toward the user on a cold day in winter.

FIG. 4 also illustrates a light emitting portion 418 which is located within the same or adjacent opening within the ceiling plane for the provision of ambient light to the space. Light emitting portion 418 is powered and controlled by electrical connection 415 via node control point 416. The light emitting apparatus contained within light emitting portion 418 can be any combination of light sources with optics and circuits that permit the light to be turned on, dimmed, tuned or even spatially modified via electrically activating different light sources next to different optics that can create combinations of controlled optical radiation patterns 411 within the space below.

One advantage of electrical cable 415 is that it is capable of carrying both power and data within the same multi-element cable and it can be conveniently routed throughout ceiling node 408 via node control point 416 to provide power and data to both the air handling section 419 and light emitting portion 418 and may also be used to provide data and power connections to optional element 417 which can include a variety of controlled input or output devices. For example, element 417 could be an occupancy sensor that is in electrical communication with control node point 416 which uses this input to provide the control inputs to regulate the operation of air control section 419 and lighting within section 418. Alternatively, element 417 could be an output device such as a speaker that provides sound signals either directly, or via acoustic coupling to the housing for ceiling node 408. Alternatively, element 417 could be a combination input and output device which is in electrical communication with node control point 416. One such useful combination input and output device 417 could be a camera system for monitoring video information from the space and a status beacon that indicates the task status of the individual working immediately beneath the space. In this case element 417 is providing video data to the network via control point 416 and also emitting colored light or other display method that will indicate for example, when the user is on the phone, engaged in focused work or has a guest in their cubicle.

Figure 5:
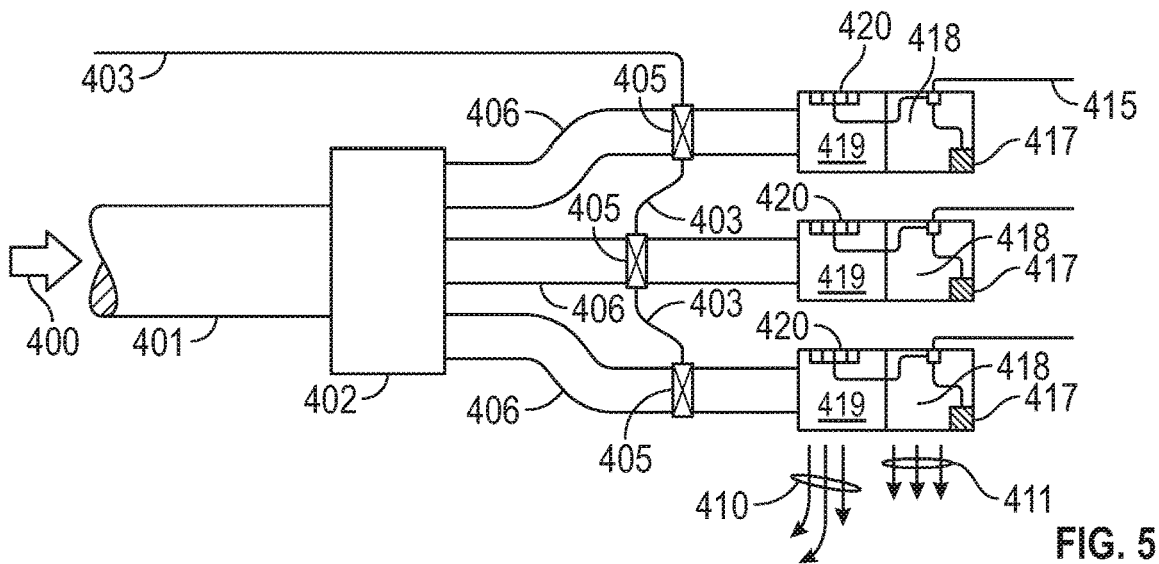
FIG. 5 is a schematic of a second embodiment of an HVAC and lighting system service node with in-line control of air flow.

FIG. 5 is similar in overall architecture to FIG. 4 except that control valves 405 are placed into the path of the duct 406 that passes from a distribution box 402 to the ceiling node 408. Each of these control valves 405 are connected to an external electrical line 403 that provides either power, or data and power, that will be able to activate valves to control the flow of air in one, or both, directions via duct 406. Control inputs for FIG. 5 are via lines 403, for example, which could be connected via category cable carrying both power and data such that individual control valves 405 are independently addressed and controlled independently as may be desired to modify the fraction of air flow 400 passing through respective ducts 406. As drawn in the figure these cable connections 403 are shown daisy chained together from one valve to the next but they could also be separate cables for each of the control valves 405 if desired.

Figure 6:
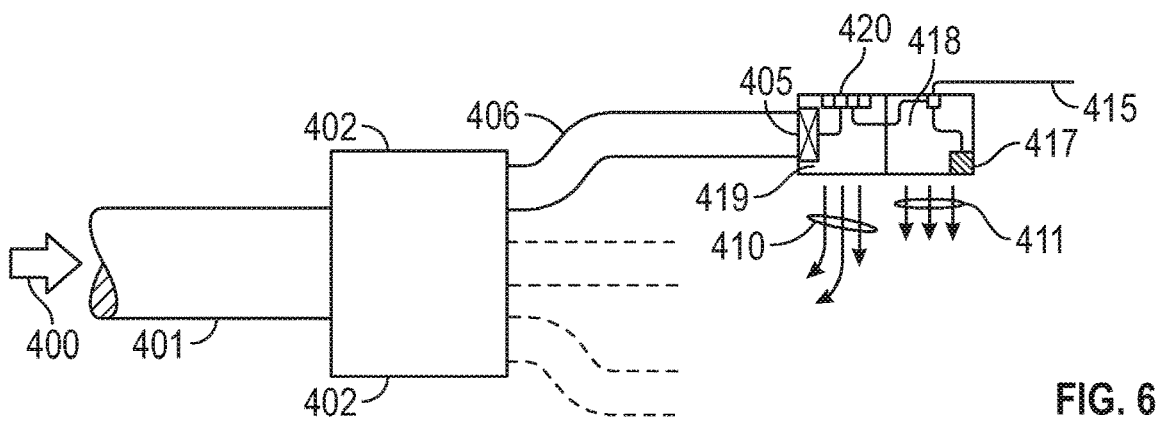
FIG. 6 is a schematic of a third embodiment of an HVAC and lighting system service node with all control and power combined at the service node.

FIG. 6 is also similar to the embodiments in FIG. 4 and FIG. 5 and illustrates how the control valves 405 could also be located in immediate proximity to the air handling section 419 of the ceiling node 408. The figure only shows one of these ducts 406 and the invention could rely on as little as one duct for a small office to a much larger number if the system is designed to support many ceiling nodes in a large open plan office. While FIG. 4 discloses a distribution box with active air flow control from a central point that is then ducted to/from individual luminaires, FIG. 6 discloses the active air flow control taking place at the ceiling node instead. One advantage of the embodiment in FIG. 6 is that it permits data and power connection 415 to provide a single connection to the service node 408 that contains all the power and data needed to operate input and output air flows, power the lighting components, obtain data from optional sensors at various locations within the space and power and control a variety of other services and functions from a single cable connection.

Different size offices and installations could find advantages in laying out their combined systems in one of these three different embodiments as a matter of economics or potential granularity of control that may be needed to support a particular space. One such example is where the space may be very large and many service nodes are needed and groups of these may be grouped together from an air handling point of view. The level of lighting control may be best implemented at the individual luminaire section level but the level of air handling control could be bundled such that single distribution box 402 is needed with a single flow control valve 405 that subsequently splits into four distribution ducts 406 running to four service nodes 408. In this case it would make more sense to place the control wiring at the distribution box 402 via control line 403 and have this box provide four matched outputs to four individually controlled service nodes that have independent lighting level control via control lines 415. It should be appreciated that the economics for the layout of service nodes and junction boxes and their wiring choices may be driven by the granularity of control needed for the respective functions utilized within the space.

Figure 7:
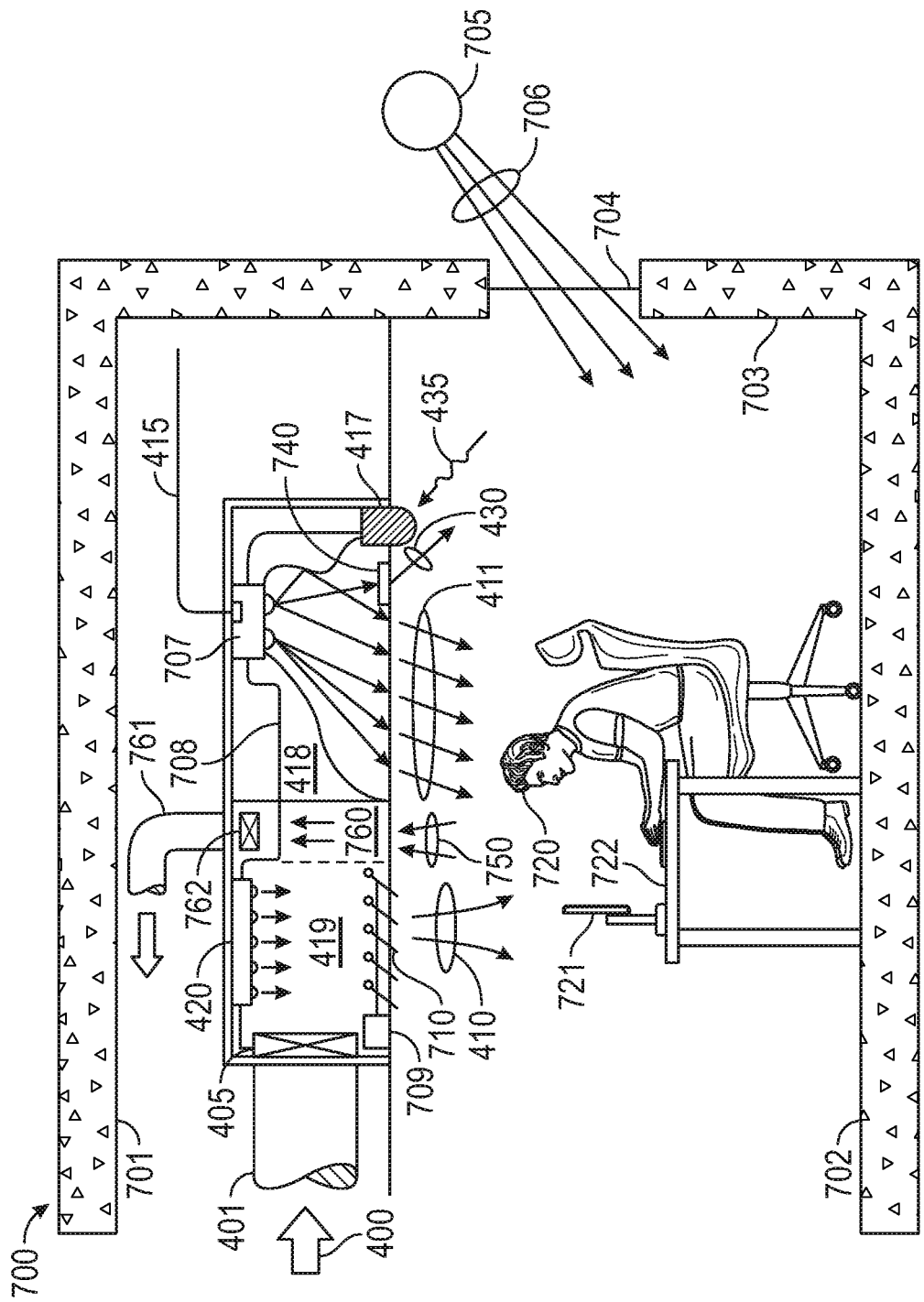
FIG. 7 is an implementation of the invention within the ceiling within proximity to a user in a typical office.
Figure 8:
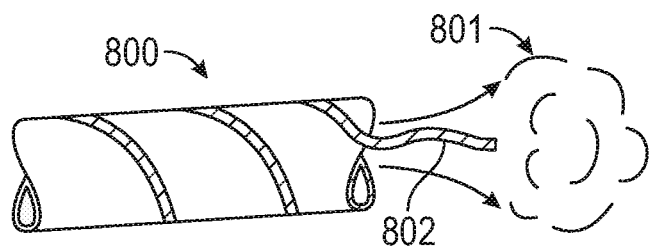
FIG. 8 is a combination air, power and data conduit that could be used to convey all outside requirements to a ceiling service node.
Figure 9:
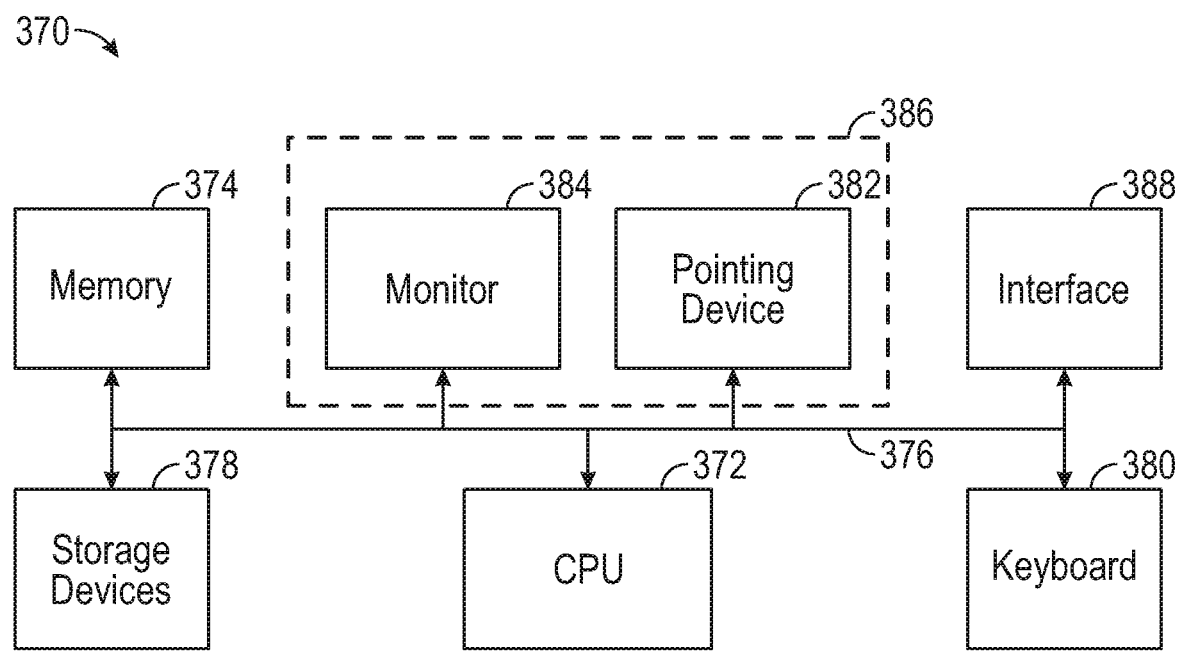
FIG. 9 is a block diagram of a distribution system according to an embodiment of the present disclosure.

FIG. 7 illustrates an embodiment of the disclosure within an office space 700 that is inhabited by a user 720 performing some task. User 720 could be working on visual and cognitive tasks at desk 722 with horizontal visual tasks on the desk and vertical visual tasks on a computer monitor 721. Ceiling service node 408 in the ceiling plenum contains combined air control section 419 which is located alongside the lighting section 418. Typically, the ceiling services are delivered by air vents and lighting fixtures that are installed in a horizontal ceiling plane which is "dropped" below the hard ceiling surface 701 that is usually a concrete slab ceiling/floor plate (also 702) that defines the floors in a multistory office. FIG. 7 is also configured in a manner similar to FIG. 5 where the air control valve 405 is also located at the entrance to the air control section 419. As disclosed previously, the air 400 that is shown going into the air control section could also be extracted from the room through a second duct and air control valve. As illustrated in FIG. 7, the exhaust air 750 is shown passing through an inner plenum 760 of air control section 419 where it eventually reaches an air control valve 762 that can control the exhaust air mass flow rate from the room via duct 761. As disclosed this is useful, for example, during certain conditions when smoke or other noxious substances can be blocked from exhausting from the service node and potentially being mixed with other air in the system where it could spread to neighboring offices. This configuration can also be used to limit the spread of airborne pathogens and viruses from within locations such as health care environments and research facilities.

FIG. 7 shows input air coming from the HVAC system via a duct 401 where it is then controlled via valve 405 at the entrance to air control section 419. When it is inside section 419 the air can be processed by for example ultraviolet light sources on module 420 that can sterilize the air prior to introduction to the room. Further functions incorporated into module 420 may include a circuit board with an option for actuators and reservoirs for dispensing certain types of airborne substances and chemicals that could be used for ambient scent, purification, disease fighting or health enhancement, or the like.

As the air 400 is flowing into the service node it will naturally escape through a path of least resistance where it can mix 410 with outside ambient air. This exit path from the air control section can also have aerodynamic surfaces 710 that could be actuated by control servo element 709 to tune the flow rate and direction of air flow dynamically within the space below. An example of the utility of this approach is that as sunlight 706 from sun 705 streams through window 704 in wall 703 striking an occupant such as 720 it could cause radiative heating of the occupant 720 which will make it feel much warmer than the average air temperature in the space would indicate. In this example control servo element 709 can be designed to automatically turn the louvers 710 such that the mass flow rate for the air 410 can be changed in direction and possibly in width of distribution such that the user 720 is more comfortable. Since the determination of comfort can be very subjective, the system includes in one embodiment processing which occurs at either a remote location or locally at unit 707 to learn via feedback from the user what is comfortable relative to the amount of thermal energy passing through window 704 and gradually become better able to anticipate the variety of conditions and states that are desired and then automatically deliver these. Still further, multiple sensors could be used to determine temperatures at various locations within the space, such as but not limited to, at wall 703, along floor 702, at desk 722 or computer 721, or the like.

FIG. 7 also shows the main power and data connection 415 coming from elsewhere in the building. It is capable in one embodiment of carrying both power and data to the service node via control unit 707 which can be a modular circuit board that contains a variety of components including light emitting diodes or other electroluminescent light sources for light emission, processors for executing commands based upon certain data inputs, memory for storing information and other peripheral electronic components that can be used to sense and act on the environment. Examples of other peripheral components include element 417 which is shown as exposed within the office environment and which could be, for example, a camera that sees an image of the room 435. Control unit 707 may store this information and gradually develop statistics on externally sensed conditions and then be better able to anticipate and act on this information in either or both of its respective sections 419 or 418.

The light sources from within section 418 of the service node can be single spectrum or multi-spectrum types such that light can be mixed within an optical structure within section 418 prior to emission 411 from the unit. Alternatively, some light sources may be dedicated to a different optical escape path from 418 and could be emitted with different characteristics than light emission 411. These characteristics could include differences in light distribution spatial patterns, spectral content or combinations of both.

In FIG. 7 it is also important to note that the external power and control wiring 415 can come from a network hub, another ceiling node or any other point in the network and that, while its capacity for data or power may be limited by electrical codes, it is possible to have sufficient power within the safety standards to provide not only illumination but also controlled air flow into a space without the added cost or difficulty of installing and operating two completely different system services.

Another feature of this combined design for air control, lighting and other services in a ceiling node is that the airflow that is coming into the node could also be directed to provide additional cooling of the light sources and electronics to aid in reducing the stress on components to improve longevity.

FIG. 8 illustrates a combined electrical power and data conductor designed to be located alongside an air duct such that all service delivery can be provided in one connection at a ceiling service node. Embodiments of the disclosure reduce the effort and complexity of installing, servicing or changing around the ceiling service nodes within a configured space. The multi conductor cable 802 could be like category cable and carry multiple conductors to support both power and data and be either wound around or parallel to air duct 800 such that the speed and convenience of connecting or changing the layout of service nodes in the ceiling is even simpler.

In one embodiment, a Power over Ethernet (POE) switch may be used as a driver for the lighting and other components (such as vents and air flow distribution elements) in the luminaire board and lights thereon. Alternatively, intermediate elements such as a lighting controller, wall switches, multiple sensors, and the like, may be employed between the luminaire and its ultimate power supply.

In one embodiment, the circuit board provides only electrical connections allowing for operation of the attached lighting elements. Control of the lighting elements, such as their functionality, is controlled with an external controller 100 such as is shown in block form in FIG. 4. Controller 100 may be coupled also to wall switches, sensors, and the like, and may be in one embodiment provided with data and power through the POE switch. POE switch is in turn coupled for communication with a computer (see FIG. 10) to allow for control of operations for the system.

FIG. 9 shows a representative system that may be connected to and/or used to control embodiments of the present disclosure or a controller, such as controller 100, for those embodiments. The system 1000 described herein is usable on all the embodiments herein described, and may comprise a digital and/or analog computer. FIG. 10 and the related discussion provide a brief, general description of a suitable computing environment in which the controller 100 can be implemented. Although not required, the controller 100 can be implemented at least in part, in the general context of computer-executable instructions, such as program modules, being executed by a computer 370 which may be connected in wired or wireless fashion to the controller 100. Generally, program modules include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the invention may be practiced with other computer system configurations, including multi-processor systems, networked personal computers, mini computers, main frame computers, and the like. Aspects of the invention may also be practiced in distributed computing environments where tasks are performed by remote processing devices that are linked through a communications network. In a distributed computer environment, program modules may be located in both local and remote memory storage devices.

The computer 370 comprises a conventional computer having a central processing unit (CPU) 372, memory 374 and a system bus 376, which couples various system components, including memory 374 to the CPU 372. The system bus 376 may be any of several types of bus structures including a memory bus or a memory controller, a peripheral bus, and a local bus using any of a variety of bus architectures. The memory 374 includes read only memory (ROM) and random access memory (RAM). A basic input/output (BIOS) containing the basic routine that helps to transfer information between elements within the computer 370, such as during start-up, is stored in ROM. Storage devices 378, such as a hard disk, a floppy disk drive, an optical disk drive, etc., are coupled to the system bus 376 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 374 from at least one of the storage devices 378 with or without accompanying data.

Input devices such as a keyboard 380 and/or pointing device (e.g. mouse, joystick(s)) 382, or the like, allow the user to provide commands to the computer 370. A monitor 384 or other type of output device can be further connected to the system bus 376 via a suitable interface and can provide feedback to the user. If the monitor 384 is a touch screen, the pointing device 382 can be incorporated therewith. The monitor 384 and input pointing device 382 such as mouse together with corresponding software drivers can form a graphical user interface (GUI) 386 for computer 370. Interfaces 388 on the system controller 300 allow communication to other computer systems if necessary. Interfaces 388 also represent circuitry used to send signals to or receive signals from the actuators and/or sensing devices mentioned above. Commonly, such circuitry comprises digital-to-analog (D/A) and analog-to-digital (A/D) converters as is well known in the art.

Although the present disclosure has been described with reference to preferred embodiments, workers skilled in the art will recognize that changes may be made in form and detail without departing from the spirit and scope of the disclosure.

What is claimed is:

1. A luminaire for lighting and for distribution of conditioned air to a space external to the luminaire, comprising:
   a housing comprising a lighting element, a duct opening, and at least one air vent coupled to the duct opening, the at least one air vent configured to deliver conditioned air to the space external to the luminaire; and
   a controller for control of lighting and distribution of conditioned air from the luminaire to the space external to the luminaire;
   wherein the at least one air vent includes at least one valve, the controller configured to operate the valve to control air flow through the at least one air vent to the space external to the luminaire.

2. The luminaire of claim 1, wherein the controller comprises:
   a low voltage power supply;
   a data and power connection from the controller to the lighting and the at least one air vent, the data and power connection coupling data and power to the luminaire.

3. The luminaire of claim 1, wherein the housing is of injection molded construction.

4. The luminaire of claim 1, wherein the duct opening is coupleable to an external ventilation system to deliver external conditioned air to the space external to the luminaire.

5. A method of controlling light and conditioned air delivery within a space, by a single combined lighting and conditioned air fixture, the space external to the single combined lighting and conditioned air fixture, the method comprising:
   providing control and power signals to a controller coupled to the single combined lighting and conditioned air fixture;
   controlling lighting functions via the controller; and
   controlling conditioned air functions via the controller.

6. The method of claim 5, wherein controlling conditioned air functions comprises directing conditioned air to an occupant's location within the space external to the fixture.

7. The method of claim 6, and further comprising reducing airflow to the space external to the fixture during a period of unoccupancy of the space.

8. The method of claim 7, and further comprising restoring air flow to the space external to the fixture when an occupant returns to the space.

9. The method of claim 8, and further comprising determining when an occupant leaves the space and returns to the space using at least one occupancy sensor.

10. The method of claim 5, wherein controlling conditioned air functions further comprises controlling valves in the combined lighting and conditioned air fixture to direct conditioned air to a determined location within the space external to the fixture.

11. The method of claim 5, in which the combined lighting and conditioned air fixture is a part of a system of a plurality of combined lighting and conditioned air fixtures, wherein the system monitors temperatures at a plurality of locations in the space.

12. The method of claim 11, wherein and intentionally keep certain areas at a less optimum temperature to save energy without affecting the comfort of the occupant.

13. The method of claim 5, and further comprising spatially modifying a profile of the light.

14. A combined system for control of conditioned air and lighting within a space, comprising:
   a luminaire coupleable to an air source and to a low voltage power supply, the luminaire including at least one duct opening to the space external to the luminaire, the at least one duct opening controlled by a valve;
   at least one service node coupled to the luminaire by the at least one duct, the at least one service node comprising a lighting system and an air flow system for directing to the space external to the luminaire; and
   a controller for control of functions of the luminaire and the at least one service node;
   wherein the service node is coupled to the source of conditioned air through the at least one duct, and is coupled to the controller and configured to operate lighting and conditioned air functions with power and data signals received from the controller.

15. A combined system for control of conditioned air and lighting within a space, comprising:
   a controller;
   a luminaire coupled to the controller, the luminaire coupleable to a source of conditioned air, the luminaire comprising at least one duct;
   a service node comprising a light system and an air flow system having at least one vent with at least one valve for directing air to the space external to the luminaire and the service node in response to commands issued by the controller, the service node coupled to the source of conditioned air through the at least one duct, and coupled to the controller to receive power and data.

16. The system of claim 15, wherein the controller comprises:
a low voltage power supply;
a data and power connection from the controller to the service node, the data and power connection coupling data and power to the service node.

17. The system of claim 16, wherein the data and power connection is a category cable.

18. The system of claim 16, wherein the data and power connection is a power over Ethernet (POE) connection.

19. A system for control of conditioned air within a space, comprising:
a distribution hub coupled to a source of conditioned air;
a luminaire having a light and at least one vent to provide conditioned air, fresh air, or a combination thereof to the space external to the luminaire, the at least one vent coupled to the distribution hub and having at least one valve, the controller configured to operate the at least one valve to control air flow through the air vent to the space external to the luminaire; and
a controller coupled to the luminaire to control operation of the light and to control provision of the conditioned air, the fresh air, or the combination thereof to the space external to the luminaire.

20. The system of claim 19, and further comprising:
a plurality of secondary luminaires, each secondary luminaire coupled to the distribution hub, the plurality of secondary luminaires each having a light and at least one vent to direct the conditioned air, fresh air, of combination thereof to the space external to the luminaire.

21. The system of claim 19, and further comprising:
a low voltage power source coupled to and configured to operate the controller and the distribution hub.

22. The system of claim 19, and further comprising:
a lighting fixture in the distribution hub, the lighting fixture including a light emitting portion coupled to, and powered and controlled by, the controller.

* * * * *